United States Patent
Proulx (10) Patent No.: US 9,922,357 B2
(45) Date of Patent: Mar. 20, 2018

(54) INTERACTIVE NOTIFICATIONS FOR MOBILE COMMERCE APPLICATIONS

(71) Applicant: ADOBE SYSTEMS INCORPORATED, San Jose, CA (US)

(72) Inventor: Jay Proulx, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 575 days.

(21) Appl. No.: 14/490,401

(22) Filed: Sep. 18, 2014

(65) Prior Publication Data
US 2016/0086241 A1 Mar. 24, 2016

(51) Int. Cl.
G06Q 30/06 (2012.01)
G06F 3/0484 (2013.01)
H04L 29/08 (2006.01)
H04W 4/00 (2018.01)
G06F 3/048 (2013.01)
G06Q 30/02 (2012.01)

(52) U.S. Cl.
CPC ..... *G06Q 30/0611* (2013.01); *G06F 3/04842* (2013.01); *G06F 3/04847* (2013.01); *G06Q 30/0641* (2013.01); *H04L 67/10* (2013.01); *H04L 67/22* (2013.01); *H04L 67/26* (2013.01); *H04W 4/003* (2013.01); *G06Q 30/0251* (2013.01); *G06Q 30/0267* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS 7,526,440 B2 * 4/2009 Walker ............... G06Q 30/02
705/26.7
8,014,762 B2 * 9/2011 Chmaytelli ....... G06F 17/30867
455/414.1

(Continued)

OTHER PUBLICATIONS

Yuan, X., "Internet as a Push-and-Pull Advertising Medium: Assessing Internet Users' Beliefs about and Attitudes Toward Pop-Up Advertisements and Search-Engine Sponsored Links," Dissertation, Southern Illinois University Carbondale, Dec. 2006.*

(Continued)

*Primary Examiner* — Nicholas D Rosen
(74) *Attorney, Agent, or Firm* — Shook, Hardy & Bacon LLP (57) ABSTRACT

Interactive notifications, from merchants or others soliciting a user response, are provided to the users' mobile devices for facilitating user engagement and receiving customer feedback. The interactive notifications include multiple single- or limited-action user-response options, such as buttons for purchasing the product or indicating that the user is not interested, enabling a user to immediately respond to the notification. The notification may be pushed to the mobile devices and presented on the locked screen of the mobile device or may interrupt other applications, thereby further minimizing the level of user interaction or attention necessary for responding. Analytical data may be collected from the interactive notification and may be used to tailor future notifications.

20 Claims, 6 Drawing Sheets

(56) References Cited

U.S. PATENT DOCUMENTS

| | | | | |
|---|---|---|---|---|
| 8,229,458 | B2* | 7/2012 | Busch | H04W 4/02 370/338 |
| 8,380,175 | B2* | 2/2013 | Rao | G06Q 30/02 455/2.01 |
| 9,609,108 | B2* | 3/2017 | Miura | H04M 1/72522 |
| 2005/0027612 | A1* | 2/2005 | Walker | G06Q 30/02 705/26.7 |
| 2006/0253453 | A1* | 11/2006 | Chmaytelli | G06F 17/30867 |
| 2008/0119167 | A1* | 5/2008 | Rao | G06Q 30/02 455/411 |
| 2008/0248815 | A1* | 10/2008 | Busch | H04W 4/02 455/456.5 |
| 2009/0265433 | A1* | 10/2009 | Wu | H04L 51/02 709/206 |
| 2010/0241503 | A1* | 9/2010 | Nakashima | G06Q 30/02 705/14.19 |
| 2011/0169632 | A1* | 7/2011 | Walker | H03G 3/32 340/539.13 |
| 2011/0313861 | A1* | 12/2011 | Lawrence, III | G06Q 30/02 705/14.64 |
| 2012/0158471 | A1* | 6/2012 | Jain | G06Q 30/0241 705/14.4 |
| 2012/0244836 | A1* | 9/2012 | Colbert | H04L 12/1822 455/411 |
| 2012/0303798 | A1* | 11/2012 | Crowell | G06F 11/3013 709/224 |
| 2013/0036023 | A1 | 2/2013 | Koplovitz et al. | |
| 2013/0124276 | A1* | 5/2013 | Brown | G06Q 30/0241 705/14.4 |
| 2013/0124278 | A1* | 5/2013 | Najm | G06Q 30/0207 705/14.11 |
| 2013/0325612 | A1 | 12/2013 | Sommerville et al. | |
| 2013/0332856 | A1* | 12/2013 | Sanders | G06F 3/0481 715/753 |
| 2014/0019253 | A1* | 1/2014 | Ricasata | G06Q 30/0241 705/14.64 |
| 2014/0222932 | A1* | 8/2014 | Trummer | G06F 3/0484 709/206 |
| 2014/0280559 | A1* | 9/2014 | Torgersrud | H04L 67/22 709/204 |
| 2015/0249733 | A1* | 9/2015 | Miura | H04M 1/72563 455/566 |
| 2015/0254704 | A1* | 9/2015 | Kothe | G06Q 30/06 705/14.26 |

OTHER PUBLICATIONS

Velasquez, G., "Selling Knowledge: A Sociological Analysis of Attorney Advertisements in Las Vegas," Dissertation, University of Nevada, Las Vegas, Dec. 2010.*

Ayo Omojola; Push Notifications For Abandoned Carts: A Guide for Retailers Going Mobile; 2014 Forbes.com LLC—Sep. 5, 2013; http://www.forbes.com/sites/ayoomojola/2013/09/05/how-to-recover-the-97-of-carts-aban . . . ; 9 pages.

Miva; M-Commerce Marketing: Using Push Notifications for Abandoned Carts; http://www.mivamerchant.com/blog/m-commerce-marketing-using-push-notifications-for- . . . ; 8 pages.

CartRescuer; Abandoned Carts and Push Notifications: Ecommerce Site Tips for Going Mobile; Oct. 8, 2013; http://www.cartrescuer.com/blog/2013/12/08/abandoned-carts-and-push-notifications-ecommerc . . . ; 11 pages.

Artisan; Mobile Experience Management (Gives Mobile Push Messaging a Makeover); Jun. 17, 2014; http://useartisan.com/news/press/artisan-gives-mobile-push-messaging-makeover/; 3 pages.

Tech Crunch; iOS 8's Interactive Notifications Let You Respond to Push or Texts Without Switching Apps; Jun. 2, 2014; http://techcrunch.com/2014/06/02/actionable-push-notifications/; 7 pages.

Rene Ritchie; Interactive Notifications in iOS Explained; Jun. 24, 2014; 10 pages. http://www.imore.com/interactive-notifications-ios-8-explained.

* cited by examiner

INTERACTIVE NOTIFICATIONS FOR MOBILE COMMERCE APPLICATIONS

BACKGROUND

Mobile devices tend to be used intermittently with varied user-session durations. A user may begin a session on their mobile device while waiting in line, riding the elevator, or commuting, for example, and become interrupted or otherwise put away their device when something else requires the user's attention. Merchants or other parties seeking to communicate with mobile-device users must compete for the users' attention during these windows of user engagement.

Email, text message, and other traditional forms of communication that solicit a user response (e.g., offers to purchase a product, promotions, customer surveys, or similar messages) are easily ignored or forgotten by users because they require a commitment of time and effort to respond, such as composing a reply message, launching an application, navigating to a website, etc. For example, in the case of an email from a merchant that offers a discount, a particular user might decide to respond later and accept the discount, but forget; may be uninterested; may find the offer irrelevant; or may think that responding will take too much time, or more time than the user has available at that moment, such as where the user is about to get off an elevator. This not only leaves the merchant without a response, but without valuable information about why a particular user did not respond to their communication.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present invention are generally directed to facilitating user engagement and receiving customer feedback by providing an interactive communication to mobile devices. Interactive notifications, from merchants or others soliciting a user response, are provided to the users' mobile devices and include multiple single- or limited-action user-response options to the notifications. For example, and as will be further described, in an embodiment, a notification includes a message such as a merchant's offer for a product, which may be a recommendation based on user purchase history, and a plurality of selectable user-response options enabling a user to immediately respond to the notification message, such as buttons for purchasing the product or indicating that the user is not interested in the product. In this way, user-response friction is reduced, as responding takes nearly as much effort for the user as ignoring or dismissing the notification. Further, the notification may be pushed to the mobile devices and presented on the locked screen of the mobile device or may interrupt other applications, such as a pop-up notice, thereby further minimizing the level of user interaction or attention necessary for responding to the notification. Valuable analytical data may be collected from the interactive notification and may be used to tailor future notifications.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. A full definition of any term can only be gleaned by giving consideration to the full breadth of this document. However, descriptions of some of these terms are included below to provide a clearer understanding of the ideas disclosed herein:

The terms "interactive communication" or "interactive notifications" (referred to herein as "notifications") are communications provided to user's mobile devices that include a notification message and multiple single- or limited-action user-response options thereby enabling a user to provide a response by selecting a response option from within the notification. For instance, a notification can include a notification message, which may be a merchant's offer for a product, and multiple selectable user-response options enabling a user to immediately respond to the notification message, such as a first button for purchasing the product and a second button indicating that the user is not interested in the product. The notifications may originate from merchants, service providers, or others soliciting a user response, such as a user's social contacts. Notifications, which exclude emails and text messages, may presented in a notifications window on the locked screen of the mobile device or a pop-up window that interrupts another application running on the mobile device. The notification message and the plurality of response options may be referred to as a "notification payload," which may be communicated to a client device.

The term "metadata" refers to analytical data or other data that may be collected from the interactive notification event and may be used by the merchant (or other solicitor) to understand the user, tailor future notifications, or otherwise determine how users/customers like to interact with communication from the merchant (or other solicitor). For instance, metadata might include information indicating when and how long a notification was presented on the mobile device, the applications currently running on the user device when the notification is presented, the user's location, user activity on the mobile device before and after the notification was presented, or similar data.

A "user profile" includes information about a user or identifying a user for whom a notification is presented. For instance, a user profile may include payment or billing information for the user enabling the user to complete a purchase transaction only by responding to a response option presented in the notification.

A notification "response payload" includes the response option(s) selected by the user and the collected metadata. For example, a response payload could include information indicating that a user selected a particular response, such as "Yes, I want to buy this" and metadata associated with the notification, such as the time of day or location that the user received and responded to the notification. The response payload might also include information identifying a user profile, associated with the particular user, which includes payment or billing information for the user.

A "notification policy" refers to a set of conditions, notification parameters, or rules associated with presenting the notifications. For instance, a notification policy may authorize notifications to be presented on a user's locked screen and/or may include notification parameters such as colors, formatting, size, duration, authorized times, or conditions (e.g., only during waking hours or only when connected over Wi-Fi) for presenting the notifications.

The term "solicitor" refers to computing component, such as a server or cloud service, or an application associated with a party interested in soliciting user responses via the notifications services and technologies described herein. For instance, solicitors can include the servers (or services) or applications provided by merchants, vendors, developers, service providers, marketing agencies, e-commerce companies, or other parties seeking a user response to a notification.

As described previously, responding to traditional forms of communication, which solicits a user response (e.g. emails, text messages, or tweets from merchants, for example) requires users to open and read the communication with an appropriate application, navigate to shopping carts on merchant websites, composing a text message reply, or otherwise may require the user to engage in multiple steps to ultimately respond to the communication, leaving users unsure of the time commitment and level of engagement required to complete a response. Such methods of communication are frequently ignored by distracted or disinterested users or may be forgotten by interested users who become distracted before responding. Moreover, as described above, merchants are left without valuable information about why users did not respond.

To address these concerns and limitations, embodiments of the invention described herein are directed to providing interactive communications (referred to herein as "notifications") to users' mobile devices that include multiple single- or limited-action user-response options thereby enabling a user to provide a response by selecting a response option from within the notification. In this way, user-response friction is reduced, as responding takes nearly as much effort for the user as ignoring or dismissing the notification.

Accordingly, aspects of the technology described herein are generally directed to, among other things, facilitating user engagement and receiving customer feedback by providing interactive communications ("notifications") to mobile devices. The notifications, which may originate from merchants, service providers, or others soliciting a user response, such as a user's social contacts, are provided to the users' mobile devices and include multiple single- or limited-action user-response options to the notifications. Additionally, valuable analytical data, referred to herein as "metadata" may be collected from the interactive notification and may be used to tailor future notifications.

For example, as will be discussed in further detail below, in one embodiment, a notification includes a notification message such as a merchant's offer for a product, which may be a recommendation based on user purchase history, and multiple selectable user-response options enabling a user to immediately respond to the notification message, such as buttons for purchasing the product or indicating that the user is not interested in the product. In this way, upon being presented the notification, a user can determine a level of commitment necessary for responding to the notification, which could include only clicking a single button in the notification, for example. User-response friction is thus reduced, as responding takes nearly as much effort for the user as ignoring or dismissing the notification, and users are less likely to ignore the notification. Moreover, in some embodiments, the notification format only allows the merchant or notification-originating party to provide a brief notification message along with discrete, explicit response options for users to select in response to the message.

Some embodiments of the invention include presenting the notifications according to notification policy, which specifies that notifications may be presented on the locked screen of the mobile device or otherwise specifies a priority level indicating that at least some applications may be interrupted for presenting the notification. Further, in some embodiments, the notifications may be associated with a user profile. For example, in various embodiments, a user profile may include information about user activity history, such as previous purchases, browsing or search history, or previous responses to notifications, other information associated with the user, and payment party information, such as bank or credit card information. In some embodiments, the user profile may enable users, merchants, or other parties to specify a notification policy or other preferences about notifications received and presented, and/or may be associated with a particular merchant or app installed on the mobile device.

Further, as described above, analytical data (also referred to herein as notification "metadata") may be collected from the interactive notification and may be used to tailor future notifications or determine how users/customers like to interact with communication from a solicitor. In some embodiments, this analytical data includes the user's response to a notification and may also include other metadata related to the notification. For example, such metadata might include information indicating when and how long a notification was presented on the mobile device, applications currently running on the user device when the notification is presented, the user's location, user engagement level with the mobile device when the notification was presented, user activity on the mobile device before and after the notification was presented, or similar data. In this way, solicitors may determine which recommendations or suggestions provided via the notifications are being actively ignored by users or perceived as irrelevant to users, based on user responses and the associated analytical data.

Accordingly, in one aspect, an embodiment of the present invention is directed to a non-transitory computer storage medium storing computer-useable instructions that, when used by one or more computing devices, cause the one or more computing devices to perform operations. The operations include receiving notification information including a notification message for a user and a plurality of notification response options associated with the notification message, and determining to present a notification on a client device, the notification including the notification message and response options. The operations also include presenting the notification on the client device and determining a response to the notification including determining one or more of the plurality of response options selected by a user. The operations further include generating a response payload comprising information about the determined response.

Another embodiment is directed to a system that includes one or more processors and a non-transitory computer storage medium storing computer-useable instructions that, when used by the one or more processors, cause the one or more processors to receive content for a first notification; generate a first notification payload using the received content for a first notification, the first notification payload including a notification message and a plurality of notification response options; provide the first notification payload to a client device; and receive a first notification response payload from the client device including information indicating a user selection of one or more of the plurality of response options selected.

A further embodiment is directed to a computer-implemented method. The method includes determining a notification to present on a client device, the notification including a notification message and a plurality of selectable response options associated with the notification. The method also includes presenting the notification on a first portion of a display on the client device; receiving a selection of at least one response option, the selection received via the first portion of the display; and collecting metadata associated with the notification. The method further includes providing notification response data including information indicating the received selection and collected metadata.

Figure 1:
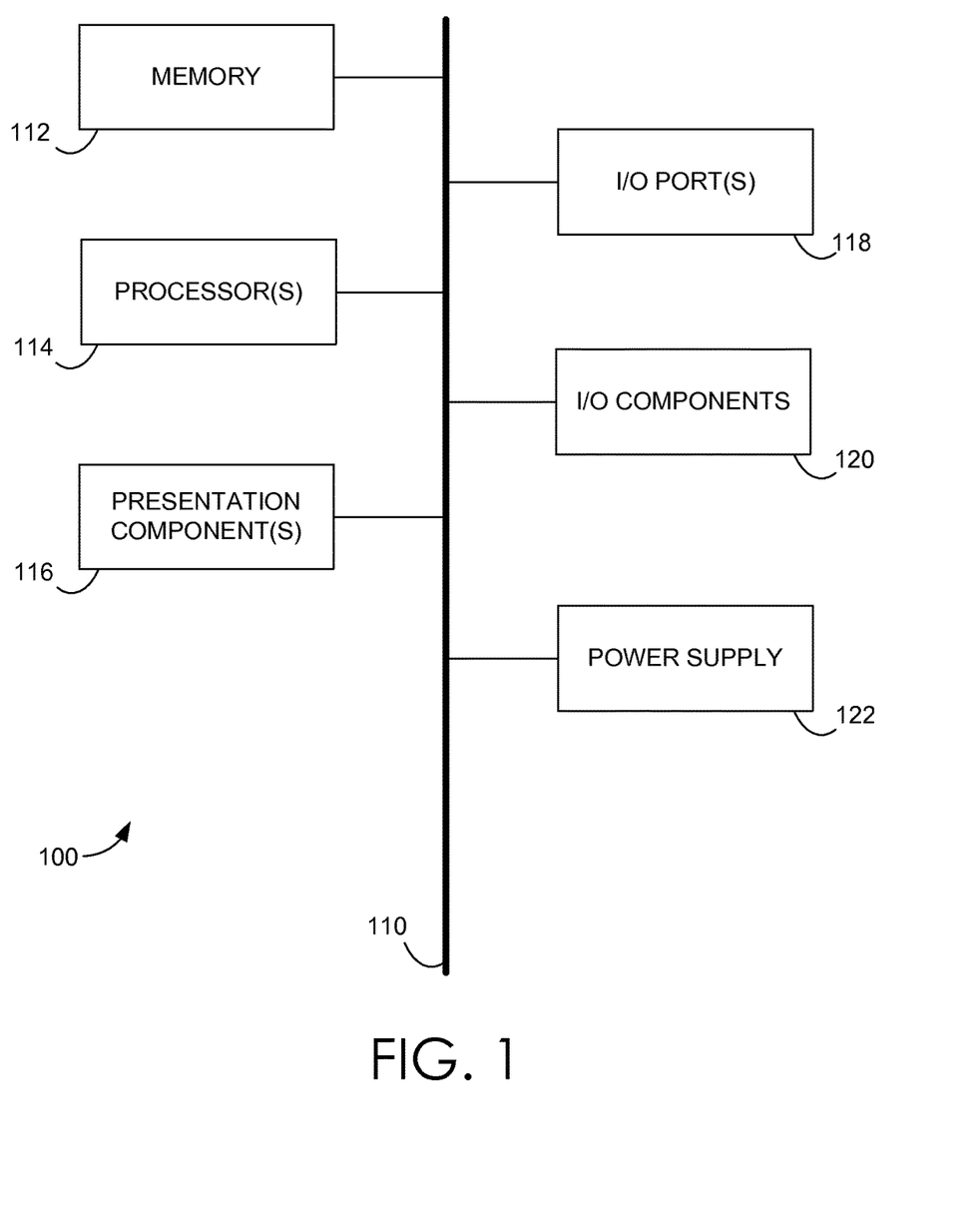
FIG. 1 is a block diagram of an example computing environment suitable for use in implementing embodiments of the invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 1, computing device 100 includes a bus 110 that directly or indirectly couples the following devices: memory 112, one or more processors 114, one or more presentation components 116, one or more input/output (I/O) ports 118, one or more I/O components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventor recognizes that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile media, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

The I/O ports 118 allow computing device 100 to be logically coupled to other devices, including I/O components 120, some of which may be built in. Illustrative components include a microphone, joystick, game pad, satellite dish, scanner, printer, communication component (e.g., network communication component, radio or wireless communications component, or the like), etc. The I/O components 120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 2:
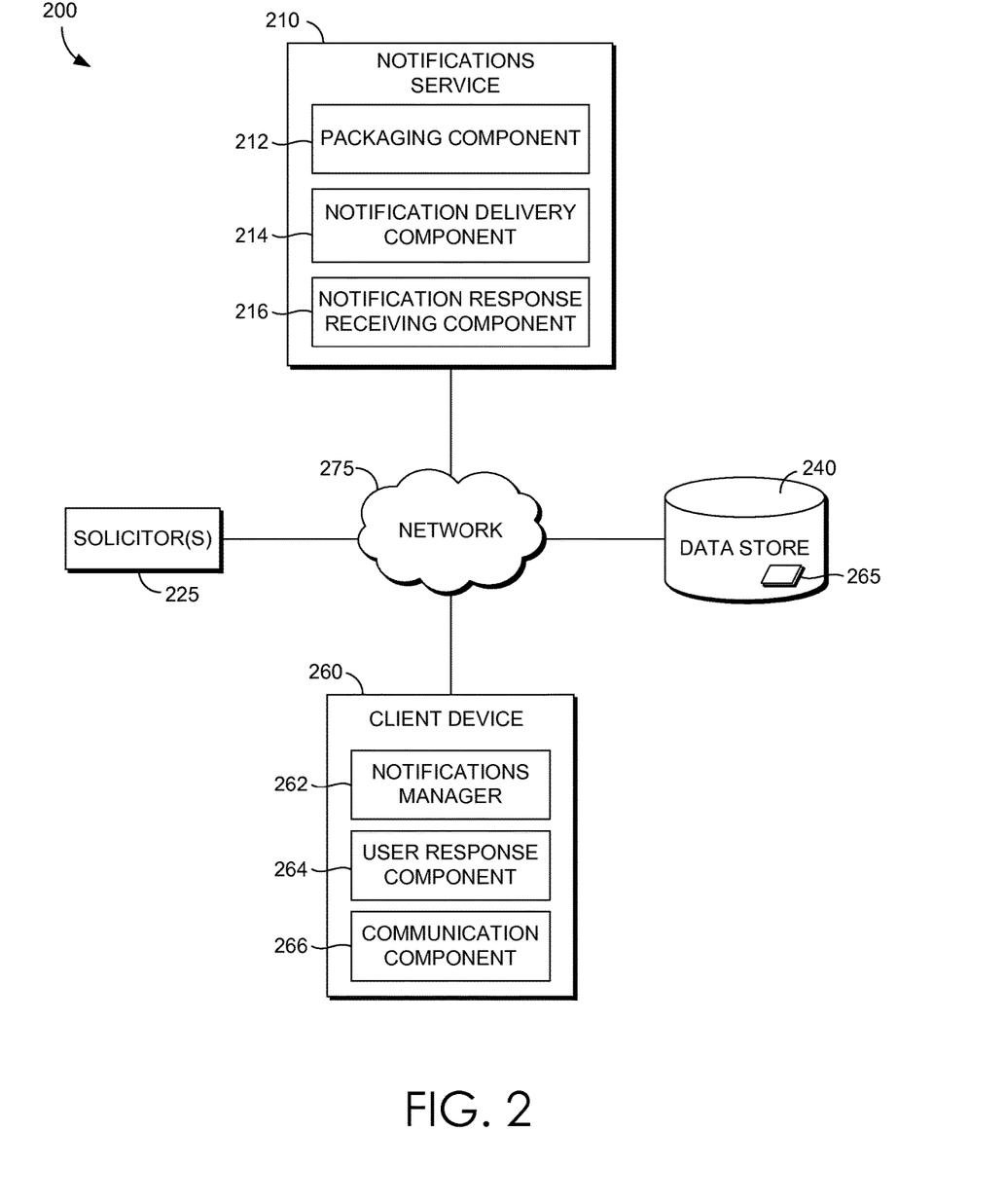
FIG. 2 is a block diagram of an example system architecture in which embodiments of the invention may be employed.

Turning now to FIG. 2, a block diagram is provided showing aspects of an example system architecture suitable for implementing an embodiment of the invention and designated generally as system 200. It should be understood that this and other arrangements described herein are set forth only as examples. Thus, system 200 represents only one example of suitable computing system architectures.

Other arrangements and elements (e.g., machines, interfaces, functions, orders, and groupings of functions, client devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 200 includes network 275 communicatively coupled to client device 260, notifications service 210, one or more solicitors 225, and data store 240. The components shown in FIG. 2 may be implemented using one or more computing devices, such as computing device 100 described in connection to FIG. 1. Network 275 may include, without limitation, one or more local area networks (LANs) and/or wide area networks (WANs), including networks implemented over wired and/or wireless technologies such as Wi-Fi, cellular, 3G, 4G, or other wireless network technologies used in conjunction with mobile devices. Such networking environments are commonplace in offices, enterprise-wide computer networks, intranets, and the Internet. It should be understood that any number of client devices 260, data store 240, solicitors 225, and/or notification services 210 may be employed within the system 200 within the scope of the present invention. Each may comprise a single device or multiple devices cooperating in a distributed environment. For instance, data store 240 may be provided via multiple devices arranged in a distributed environment that collectively provide the functionality described herein. Similarly, some aspects of system 200 may be embodied or partly embodied as an app or service on a mobile device, server, cloud, or one or more services of a mobile e-commerce platform, and/or may include an API for interfacing with other applications and services. Additionally, other components not shown may also be included within the network environment.

Example system 200 includes one or more solicitors 225. As used herein the term "solicitors" is intended to denote a computing component (such as a computing device 100) associated with a party interested in soliciting user responses via the notifications services and technologies described herein. Examples of solicitors 225 include merchants, vendors, developers, service providers, marketing agencies, e-commerce companies, or other parties seeking a user response to a notification. In one embodiment, solicitors 225 include a social network contact of a user that uses an embodiment of these notifications technologies to "poll" the user about a particular topic, item, event, or other information. For example, if the user and her friends are planning to see a movie, one of the user's friends may send a notification to the user and other friends asking whether they should all go to see Movie A or Movie B, providing both movies as selectable options to the notification response. Similar notifications may ask about meeting times or dates, other activities or events, or any type of query that can be provided with selectable response options suitable for a notification as provided in the embodiments described herein.

Client device 260 may comprise any type of client device capable of receiving input from a user, such as described below. Although FIG. 2 shows one example client device 260, a user may use or be associated with more than one device. In some embodiments, a client device receiving input from a user is associated with user identification for the user or user profile, as described below.

In one embodiment, client device 260 may be the type of computing device described in relation to FIG. 1 herein. By way of example and not limitation, a client device 260 may be embodied as a personal data assistant (PDA), mobile device, laptop, tablet, vehicle computer system, appliance, consumer electronic device, or other electronics device capable of receiving input from a user. The input may be received by one of many different modalities, such as by way of example and not limitation, voice or sound, text, touch, click, gestures, or other input technologies described in connection to FIG. 1. All of these forms of input, as well as others not specifically mentioned herein, are contemplated to be within the scope of the present invention.

Client device 260 comprises a notifications manager 262, a user response component 264, and a communication component 266. The notifications manager 262, in general, manages the presentation of notifications and determines to present notifications on client device 260, such as what content to present, when to present a notification, how to present it, the priority of the notification, and/or conflict resolution if there are multiple notifications competing for priority. In some embodiments, notifications manager 262 receives notifications information from communication component 266. Notifications information or prepared notifications may be stored on data store 240 until presented, in some embodiments.

In some embodiments, the notifications manager 262 uses a notifications policy, which can be received from notifications service 210, a solicitor 225, an app installed on client device 260, or set by a user associated with client device 260, or a combination of these, for example. In an embodiment, a user "opts in" or consents to receiving the notifications, which may happen when the user signs up for service from a solicitor or installs an app, for example. The notifications policy may be associated with a user profile, one or more solicitors or apps, or a wireless carrier.

In some embodiments, a notifications policy determines a priority associated with the notification, such as whether the notification should interrupt other applications running on client device 260. In such embodiments, notifications may be presented as a pop-up window or indication icon appearing in a status bar of client device 260, and/or appear in (or as an indication in) a widget on the home screen of client device 260, for example. A notifications policy may specify whether a notification should be presented on the locked screen of the device 260 or when device 260 is in a locked state, or when device 260 is in a power-saving mode or sleep mode. In some embodiments, a notifications policy includes security policies, such as whether the user has authorized purchases to be made directly from a notification or whether the user requires a confirmation number or pin to also be provided in order to complete a purchase. Embodiments of the notifications policy may include parameters relating to the presentation of notifications such as colors, formatting, size, duration, authorized times, or conditions (e.g., only during waking hours or only when connected over Wi-Fi). For example, in an embodiment, notifications manager 262 uses metadata as described in connection to user response component 264 to determine present conditions associated with client device 260, such as location, time, currently running applications, etc., and determines to present a notification based on one or more of these conditions. For example, a user may be presented with a discount to purchase a new pair of running shoes immediately following conditions indicating that the user was likely running, which may be determined based on location and motion information and a currently running streaming music app. In this manner, notifications may be precisely timed to provoke a user response desired by the solicitor.

In one embodiment, notification information may be determined from information derived from standard notifications, app notifications, push notifications, instant messages, text messages, email, or other similar communications received on client device 260. For example, notifications manager 262 may generate an interactive notification (as described herein), based on content obtained from these other communications, in some embodiments. In one embodiment, a software service, routine, or application running on client device 260 may enable these ordinary communications to be presented as the interactive notifications. In this way, embodiments of the invention can leverage existing communications processes and infrastructures.

User response component 264 is generally responsible for receiving a user response to a notification, which in some embodiments includes a user-selected response option. In some embodiments, user response component 264 associates a received user response with a user profile (or user account), solicitor 225, app, or user session. Some embodiments of user response component 264 receive one or more user responses to a notification(s) and prepare a notification response payload that includes information about the user response and may also include other analytical data or metadata associated with the notification. Examples of such metadata can include information indicating when and how long a notification was presented on the mobile device, applications currently running and/or media being presented on the user device when the notification is presented, the location of client device 260, time of day, user activity prior or subsequent to the time a notification is presented and/or responded to, user actions performed prior to or just after the notification, user engagement level or duration with the notification, user eye contact level with the client device as the notification is displayed (which may be determined from cameras embedded in client device 260), screen activity, motion or acceleration (such as information indicating that a user may be running or working out, which may indicate a state of mind more open to making a purchase), and other data that may be deemed useful for analytics, such data used for tailoring future notifications to provoke specific user responses.

Communication component 266 is generally responsible for communicating information about notifications to and from client device 260. Communication component 266 receives notification information (not shown) which may be received in advance of the time the notification is presented, from notifications service 210 or from a solicitor 225. In some embodiments, communication component 266 provides notification information to notifications manager 262. Communication component 266 also communicates notification response information, which in some embodiments takes the form of a notification response payload, to notifications service 210 and/or one or more solicitors 225.

Figure 3A:
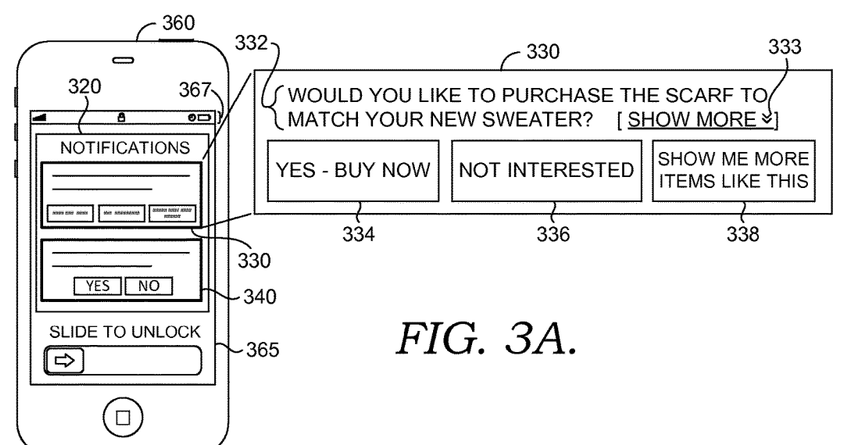
FIGS. 3A and 3B depict aspects of example interactive notifications in accordance with embodiments of the invention.

The notification information received by communication component 266 includes a notification message for presenting to a user (such as message 332 shown in FIG. 3A) and multiple selectable response options associated with the notification message (such as response options 334, 336, and 338 shown in FIG. 3A). In some embodiments, the notification information also includes notification parameters, which may specify conditions for presenting the notification (e.g., color; size; screen location; other presentation formatting; presentation time, date, and/or location; presentation duration; priority, such as whether to present the notification on a locked screen; or specific metadata for user response component 264 to collect, for example). The notification parameters may be associated with a notifications policy. In an embodiment, the notification information is received as a notification payload.

Continuing with FIG. 2, notifications service 210 comprises a notification packaging component 212, notification delivery component 214, and notification response receiving component 216. The notifications service 210 may be embodied on one or more servers comprising one or more computing devices, such as the type of computing device described in relation to FIG. 1 herein, as a cloud-based service, or may be distributed on the client device and one or more solicitor(s) 225. In one embodiment, notifications service 210 is embodied as a notification server.

Packaging component 212, in general, receives content for a notification and prepares notification information. In some embodiments, the notification information comprises a notification payload. The notification content may be received from one or more solicitors 225 or other parties, including parties acting on behalf of solicitor(s) 225. In some embodiments, packaging component 212 is included with solicitor(s) 225, client device 260, or exists as an independent component that receives notification content and prepares notification information for client device 260. Further, in some embodiments, the notification information prepared by packaging component 212 includes instructions and/or formats for specific types of client devices 260. In some embodiments, packaging component 212 includes notification parameters in the prepared notification information. Packaging component 212 provides prepared notification information, such as a notification payload, to notification delivery component 214, in an embodiment.

Notification delivery component 214 is generally responsible for communicating prepared notification information to client device 260. In some embodiments, based on a notifications policy, notification delivery component 214 communicates notification information as "push" notifications. The term "push" is understood in the art to mean communication that initiates information transfer from a server, such as a sever associated with notifications service 210 to a client, such as client device 260; in contrast to pull types of communication initiated by the client, such as polling. Push communication typically reaches the client device sooner, whereas pulling retrieves information only as often as a client device polls the server, which may be less frequent to preserve battery life. Both push and pull communications are contemplated within the scope of embodiments of the invention. For example, one embodiment uses the Apple Push Notifications Service developed by Apple Inc. In one embodiment, notification information may be determined from information derived from standard notifications, instant messages, text messages, email, or other communications intended for client device 260.

As described above, in some embodiments, a notifications policy may specify delivering notifications only over Wi-Fi or during certain times of the day. In embodiments wherein a notifications policy specifies conditions for delivering the notification information or presenting a notification, such as location, time of day, or prerequisite user activity on the client device, notification delivery component 214 communicates the notification accordingly. In some embodiments, notification delivery component 214 may deliver notification information to client device 260 in advance of when the notification is to be presented, based on a notifications policy or available connection speed. For example, notifications may be provided to client device 260 overnight, while the client device is charging and in the user's home, which may have a Wi-Fi connection. But a notification may not be presented until later in the day, such as when the client is commuting home from work.

Notification response receiving component 216 is generally responsible for receiving information about user responses to notifications from client device 260 including, in some embodiments, analytical data such as metadata associated with the notifications, which may be used to tailor future notifications. In an embodiment, notifications response receiving component 216 receives a response payload from communication component 266 of client device 260. Notification response receiving component 216 provides or makes available the received response information to the solicitor associated with the notification. In some embodiments, notification response receiving component may be embodied on solicitor(s) 225, such as in some embodiments where the notification response is communicated directly back to the solicitor.

Data store 240 generally facilitates storage of notification information, notification parameters, policies, responses, user profiles, user IDs, user account information, notification payloads, response payloads, solicitor information, user history, processed and unprocessed analytical data including metadata related to notifications, and other stored information used in various embodiments of the invention. In some embodiments, the analytical data includes de-identified data based on metadata associated with notifications collected from a population of users. Such data may also include, for example, user responses and metadata, user engagement levels with notifications, or words or presentation formats that are more likely to induce particular user responses (such as purchases). Although depicted as a single data store component, data store 240 may be embodied as one or more data stores, including data stores on client device 260, notifications service 210, and/or solicitor(s) 225, or may be in the cloud.

In some embodiments, data store 240 includes user profile 265. User profile 265 may take the form of one or more user accounts or user identification associated with the client device 260, one or more solicitors, and/or payment providers (e.g., credit cards, banks, other payment services such as PayPal or Google Wallet, or the mobile device carrier). For example, a user profile may include credit card payment or billing information for the user; and authorization or permissions (e.g., allowing purchases via a single response to a notification), which may be reflected in a notifications policy associated with the user profile 265 and which may be accessible to a plurality of solicitor(s) according to the policy or terms associated with the user profile. Shipping information and/or contact information for the user may also be included. In an embodiment, user profile 265 includes user history, such as previous notification responses and related analytical data, past purchases, or browsing or search history. User profile 265 may include user preferences, including notification preferences, billing or shipping preferences, or product preferences (e.g., clothing sizes, allergies, interests, hobbies, etc.), for example. In one embodiment, a user profile 265 may be configured from a previous purchase, transaction, or partial transaction with a merchant, or from a user account with a merchant, payment provider, or carrier, which may be pre-existing.

In one embodiment, user profile 265 includes information associated with repeat product orders. For example, in the case of a user who orders coffee each month from an online coffee vendor, a notification from the coffee vendor may be presented to the user querying whether it is time to order more coffee and with response options including "YES, SEND ME MORE COFFEE," "NOT YET," or "NO LONGER INTERESTED IN YOUR COFFEE." The user profile may specify the type of coffee and payment and shipping information so that the user may re-order the coffee by clicking the "YES" response to the notification. In one embodiment, the user profile may also store a verification code or pin number, for which the user may be prompted in response to selecting a notification response to order a product or service. For example, after the user selects "YES, SEND ME MORE COFFEE," the user is prompted to enter a security pin number, a verification code, a credit card number, or an account number.

Similarly, in one embodiment, user profile 265 may include information associated with future product or service orders. For example, in the case of a user who rents mail-order movies or games, a notification may be provided to the user querying whether it is time to send the next game or movie. In this example, the user has pre-populated a "watch list" of movies or "play list" of games to receive, which is stored in the user profile 265. Upon responding "YES" to the notification, the next movie or game (or other product or service) on the list is provided to the user.

Figure 3B:
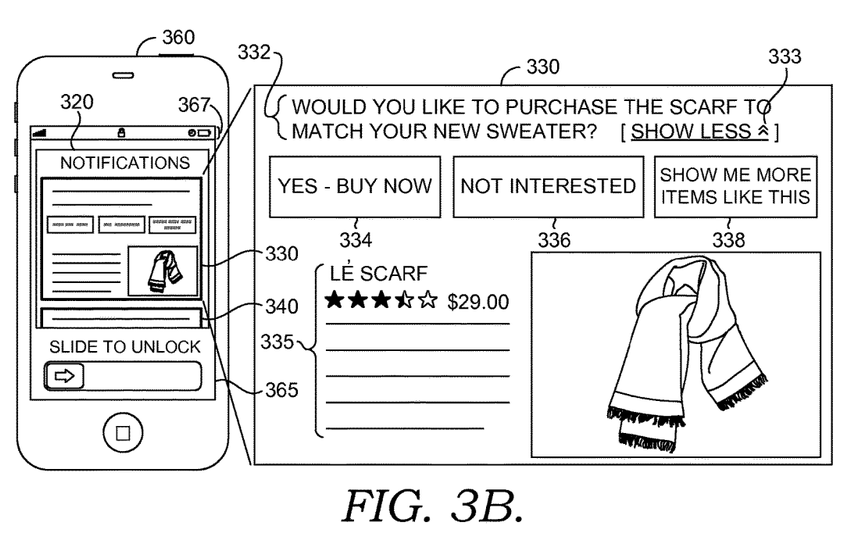

Turning now to FIGS. 3A and 3B, aspects of one embodiment of interactive notifications are provided. FIGS. 3A and 3B show an example client device 360, which may be embodied as client device 260 described in connection to system 200 of FIG. 2. Example client device 360 includes a display 365, which is used for presenting notifications. Display 365 includes a status bar 367, which in this example includes a padlock icon indicating that the client device is in a locked mode. Display 365 also shows a "slide to unlock" mechanism, which also indicates that example client device 360 is in a locked mode.

A portion of display 365 includes a notification area or window 320 that presents one or more notifications. In this example, the notifications window 320 presents a first notification 330 and a second notification 340. In some embodiments, only one notification is presented in notification window 320 at any one time. In such embodiments, notification 340 may be presented at a later time or alternated (or cycled) such that only one of either notification 340 or 330 is presented at any moment. (In these embodiments, the presentation and/or coordination of presenting notifications when there are more than one notification may be handled by a notifications manager, such as notifications manager 262 in FIG. 2.) Example notification 330 represents one example of a type of notification in accordance with embodiments of the invention described herein, and is enlarged for clarity.

Notification 330 includes a notification message 332 and multiple notification response options 334, 336, and 338, which may be selectable and which are associated with notification message 332. In some embodiments, notification message 332 queries the user or otherwise solicits information from the user and may take the form of a question, offer, recommendation, suggestion, or promotion. In some embodiments, notification message 332 is limited in size to a length that can be presented within an area of notification window 320. The limited size facilitates enabling the user to determine an approximate level of commitment or effort necessary for responding to the notification. In particular, a user can quickly read the notification message 332 and respond by selecting one of the selectable notification response options, such as options 334, 336, and 338. In some embodiments, it may be desirable to provide the user with some additional information 335 associated with notification message 332, such as product images, product ratings, price, or descriptions. In such embodiments, a notification 330 may be expanded to provide some additional information. For example, notification 330 includes a [SHOW MORE]/[SHOW LESS] feature 333 that expands the notification to include additional information 335 associated with notification message 332, as shown in FIG. 3B. In one embodiment, an expanded notification 330 displaces notification 340 in the notifications window 320, as shown in notification window 320 of FIG. 3B. In such embodiments, the user remains in the notification window 320 when expanding a notification without launching an app or navigating to a website; for example, the additional information 335 may be revealed or hidden by toggling the [SHOW MORE]/[SHOW LESS] feature 333.

In this example, notification message 332 of notification 330 asks whether a user would like to purchase a scarf to match the user's new sweater. This notification 330 may be based on a user's past purchase of a sweater. For example, where a user has purchased a particular sweater from a merchant, the merchant may follow up with the user, via notification 330, to recommend that the user purchase a matching scarf. In this example, the response options include a "YES—BUY NOW" option 334, which initiates a purchase transaction. (In some embodiments, such as those with a user profile having payment information, option 334 may complete the purchase transaction or may prompt the user to provide a verification code or pin number before completing the purchase transaction.) Other response options in this example include a "NOT INTERESTED" option 336, which ultimately communicates to the merchant that the user is not interested in purchasing the matching scarf, and a "SHOW ME MORE ITEMS LIKE THIS" option 338. In some embodiments, selecting option 338 may direct the user to a merchant's website or launch an application enabling the user to browse other products like the recommended scarf, such as other products that match the user's sweater.

Notification response options, such as options 334, 336, and 338, may vary based on the particular notification message 332. By way of example and not limitation, response options may include options like: "Yes;" "No;" "Buy Now" or "Buy It Now," as described above; Add To My Cart," which in one embodiment adds the item to an online shopping cart associated with the user profile, payment provider, online merchant portal, or solicitor of the notification, for example; (Thus, a user who is not yet ready to purchase the item may, nevertheless, indicate interest in the item); "Show Me More Items Like This," "Not My Size," "I'd Like More Information," etc., which may direct the user to an app or website for related products, other sizes, additional information, etc.; "Remind Me Later" or "I'm Busy Now," which may cause a notification to be presented at a later time or provide metadata to the solicitor causing the solicitor to initiate a second notification at a more optimal time to provoke a user response; "Call Me" or "Contact Me About This Offer;" "I'm Not Interested;" and "Not Relevant To Me." In some embodiments, the response options and notification message, as well as parameters controlling when, where, or how the notification is presented, may be designed to provoke a particular user response, such as purchasing a product. In some instances, these purchases are referred to as impulse purchases or passion purchases.

As described above, in some embodiments of the invention, analytical data including metadata associated with notifications and their responses is collected and may be used to tailor future notifications to provoke specific user responses. (As described above, in one embodiment, analytical data may be collected by user response component 264.) Accordingly, in some embodiments, analytical data may be collected for any of the user selected response options, including options 334, 336, or 338, in this example. Further, analytical data associated with the notification (metadata) may also be collected, including data from a time period extending to before the notification is displayed to a user to after the user has responded. Still further, the analytical data may be collected from metadata associated with previous user responses or notification responses from other users.

As previously described, the analytical data may include user responses to notifications. In one embodiment, responses may be characterized as one of three types: (1) positive or accepting (e.g., user accepts an offer or recommendation, buys a product, completes a customer survey); (2) rejection or active ignore, wherein the user indicates that he or she is not interested in the offer, recommendation, suggestion, activity (i.e., completing a survey), etc.; and (3) passive rejection or passive ignore, indicating that the user sees the notification but does not act. For example, metadata associated with a notification may indicate that the notification was displayed, as well as when, where, how long, etc., but that the user dismissed the notification or otherwise didn't respond. In some embodiments, even these passive responses (e.g., ignoring the notification) still provide responses that offer valuable analytical data to the solicitors.

As described above, the example notification 330 is only one example of a type of notification. Embodiments of the invention contemplate any notification that comprises a notification message portion (such as notification message 332) and multiple notification response options (such as options 334, 336, and 338). For example, in some embodiments, notification response options and/or the notification message may be time or location sensitive (or may vary over time or location) or may be specific to a particular user, such as an option to apply a user's credit or coupon towards a purchase (e.g., an option stating "BUY NOW USING YOUR POINTS").

In another example (not shown), an embodiment of the interactive notification is used to solicit customer feedback or user information through a survey. A common practice for many businesses is to provide a survey on a customer receipt and offer the customer a discount or promotion in exchange for completing the survey. Typically, users must go online at a later time, navigate to a website and enter in a code printed on the receipt. As a result, many customers never complete these surveys, even where the surveys are short, because they forget or don't want to commit the time accessing the website and entering in the code. But using some of the embodiments described herein, a customer can receive a notification on their client device at the point of purchase (or shortly thereafter) prompting the user to take the survey or simply asking the user for a single-response feedback about their experience (e.g., "Did you receive good customer service: YES I NO"). For example, suppose the user has just ordered a coffee. A notification could be provided to the user as the user is waiting for a barista to prepare his or her coffee. The coffee vendor knows that the user just made a purchase and already has the user information (including information about the client device) accessible, such as via a user profile for that user. The notification might prompt the user to take a survey in exchange for a reward and could include options such as "Take Survey For A Discount" and "No Thanks, Not This Time." Even where the customer actively rejects the offer to take the survey or chooses not to respond at all, the coffee vendor receives valuable information about the customer, including how the customer likes to interact with the vendor.

In yet another example (not shown), an embodiment of the interactive notification is used to solicit a review for a movie, song, product, service, or app. For example, following watching a movie such as *Miracle on Ice*, a notification might query the user, "How do you rate the movie *Miracle on Ice*?" and the selectable response options might include a number of stars (e.g., "One Star," Two Stars," "Three Stars," etc.). In one embodiment, a movie theatre might solicit the notification as users are leaving the theatre after watching the movie. In another embodiment, several days after purchasing a product (or downloading an app), a notification could prompt the user to provide feedback about the product (or app), in a similar manner.

In yet another example (not shown), an embodiment of the interactive notification is used to provoke a user to make a purchase by offering a location based on a time-sensitive notification. For example, a notification may include a notification message offering a product and indicating that the customer will receive "30% off+free shipping" if purchased within the next 3 minutes, whereupon the notification ceases after three minutes. In one embodiment, the notification includes a count-down timer indicating how much time remains for the offer to be available. Again, because the presentation of the interactive notification can be precisely timed and made to interrupt other running applications or services (or appear on the locked screen), it is more likely to receive immediate attention of the user vs. other communication like email or SMS text messages.

In yet another example (not shown), an embodiment of the interactive notification is used to follow-up with a potential customer regarding an incomplete transaction between the potential customer and a vendor. For example, suppose a user (as a potential customer) has previously visited a vendor's website and browsed one or more items for purchases or even added one or more of the items to a shopping cart; but, for whatever reason, the user did not complete a purchase. In one embodiment, the vendor may follow-up with the user through an interactive notification. For example, the notification might ask whether the user wants to purchase of the items they browsed or placed in a shopping cart (or alternatively, the notification might also inform the user that they have items remaining in their shopping cart) and include notification response options such as "Buy it Now" and "No thanks, I'm not interested."

In yet another example (not shown), an embodiment of the interactive notification is used to facilitate group decision making. For example, suppose a user and a group of his friends are planning to see a movie (or go to a restaurant, or attend a concert, or some other event), using social media or other contact information for group members, the user may solicit a response from an interactive notification to his friends, which queries them about whether they want to see Movie A or Movie B.

Figure 4:
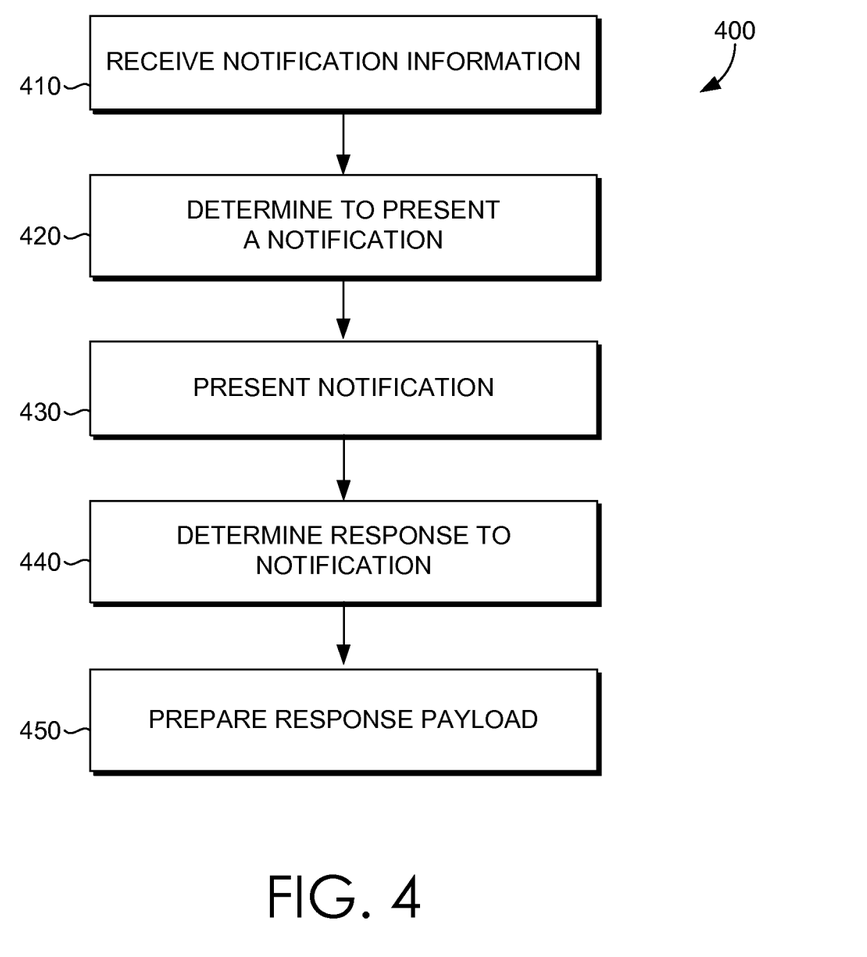
FIGS. 4-6 depict flow diagrams of methods for providing interactive notifications and receiving analytical data associated with the notifications, in accordance with embodiments of the invention.

Turning now to FIG. 4, a flow diagram is provided that illustrates a method 400 for providing an interactive notification to a user. Initially, at step 410, notification information is received. As described previously, notification information comprises a notification message for presenting to a user and multiple notification response options associated with the notification message. In an embodiment, notification information takes the form of a notification payload and may include notification parameters, such as the example notification parameters described in connection to FIG. 2, which may be used in conjunction with steps 420 and 430 for determining to present a notification and presenting the notification, respectively. For example, notification parameters may specify a time period for presenting the notification or whether the notification may be presented when the client device is in locked mode. In some embodiments, notification information also includes user profile information or user account information (or user identification for accessing an account or profile), which may include a notification policy, may be used in step 420 for determining to present a notification, and for associating a user response and metadata (as described in step 450) with a particular user. In one embodiment, notification information includes information identifying the notification solicitor or source of the notification, which may be used to indicate a recipient when communicating the response payload determined in step 450, or for determining who is permitted access to a response payload, in embodiments wherein the payload is stored and made available to the solicitor.

In some embodiments, notification information is received on a client device from a notification service, such as notifications service 210 or from a solicitor 225, and in some embodiments, the notification information may be derived from other communication such as email, text messages, or in-app information received by the client device or intended for delivery to the client device.

At step 420, method 400 determines to present a notification. In one embodiment, step 420 comprises determining how, when, and/or where to present a notification based on notification parameters or a notifications policy. A notifications policy, such as described in connection to FIG. 2, may be associated with the notification solicitor, carrier, client device (or app running on the client device), or user; for example, a user may opt in to allowing a notification from a particular vendor to be presented on the locked screen of his or her client device. In some embodiments, the notifications policy may be stored in and accessible through accessing a user profile. The notifications policy or notification parameters can specify information about when or where to present the notification, prerequisite conditions for presenting the notification, and/or how to present the notification, such as color, format, size, and/or a priority level, for example.

At step 430, the notification is presented. The notification may be presented according to the determination in step 420. The notification includes the notification message and a plurality of notification response options received in the notification information from step 410. In one embodiment, the notification response options are presented as selectable buttons or hyperlinks that are associated with response information corresponding to the button or hyperlink. For example, in one embodiment of step 430, a notification may be presented on the client device such as shown in the example of FIGS. 3A and 3B.

At step 440, a response to the notification is determined. The response to the notification includes information indicating which response option was selected by the user; thus, step 440 includes determining which response was selected or otherwise chosen by the user. In an embodiment, a user's response may include more than one of the response options, such as where the notification message queries the user to select more than one response. In an embodiment, determining the response also includes determining metadata associated with the notification and/or response, such as the types of metadata determined by user response component 264, described in connection to FIG. 2. The metadata may be used as analytical data for tailoring future notifications or providing valuable information about the user to notification solicitors.

At step 450, a response payload is prepared. The response payload includes information about the user's response to the notification, such as the one or more notification responses selected by the user. In an embodiment, the payload information also includes the metadata associated with the notification and/or response determined in step 440. In an embodiment, user profile information, user account information, and/or user identification information is included in the response.

In some embodiments, the notification payload or a portion of information from the notification payload may be provided to a notifications service and/or to one or more solicitors associated with the notification. In an embodiment, such information may be incorporated into a user profile associated with the user. In one embodiment, information in the notification payload is made available to an application associated with the notification, to the notification solicitor, or to parties associated with the solicitor.

Figure 5:
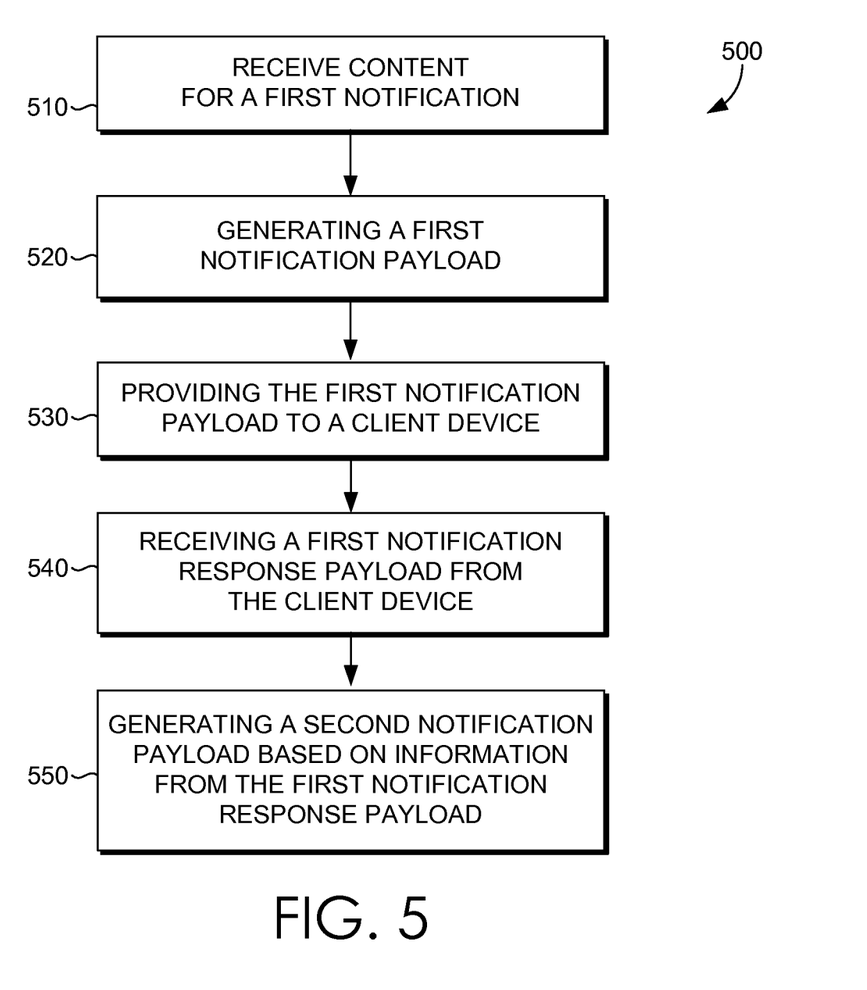

With reference to FIG. 5, a flow diagram is provided that illustrates a method 500 for providing an interactive notification, which may be provided to a client device. Initially, at step 510, content for a first notification is received. The content may be received from one or more solicitors, such as solicitors 225 described in connection to FIG. 2, for example, merchants, vendors, service providers, developers, or social media contacts. In embodiments of step 510, the content includes information for preparing a notification payload, as described in step 520, such as information for determining a notification message and multiple notification responses. In an embodiment, the content also includes one or more notification parameters, such as described above in connection to FIG. 2.

At step 520, a first notification payload is generated. In embodiments of step 520, a first notification payload includes a notification message for presenting to a user and multiple notification response options associated with the notification message, which may be determined based on the received content for a first notification from step 510. In an embodiment, the first notification payload also includes one or more notification parameters, which may be received in step 510 or received from a notifications policy, for example, and in one embodiment, the notification parameters include formatting information for presenting notifications on specific types of client devices. In an embodiment, the first notification payload includes user profile information or user account information (which may comprise a user identification or account/profile number associated with the user for accessing additional information), which may specify a notifications policy, user preferences, payment information, and other information described previously in connection with user profile 265 of FIG. 2. In an embodiment, the first notification payload includes information identifying the notification source or solicitor, which may be used for communicating information from the notification response and associated metadata or analytical data, as described in step 540. In an embodiment, the first notification payload comprises notification information, such as described in step 410 of method 400.

At step 530, the first notification payload is provided to a client device. In an embodiment, the first notification payload is provided over a network, such as network 275 described in connection to FIG. 2. In one embodiment, the first notification payload is provided as a push notification, and in an embodiment, the first notification payload is made available to the client device on a notifications server (such as notifications service 210 described in FIG. 2), and which may be downloaded by the client device. In one embodiment, an indication is provided to the notification solicitor indicating that the first notification payload has been provided to a client device.

At step 540, a first notification response payload is received from the client device. The first notification response payload may be received over a communication network such as network 275 of FIG. 2. In embodiments, the first notification response payload is a response payload such as described in connection with step 450 of method 400. For example, the first notification response payload can include information about the user response to the notification, associated metadata, and/or user profile or account information. In one embodiment, the received first notification response payload (or information from the received first notification response) is then provided to the notification solicitor. In some embodiments, the notification solicitor may use that information to tailor the content of a second notification, which may be received in a manner as described at step 510. Accordingly, at an optional step 550, a second notification payload is generated. The second notification payload is based on information from the first notification response; for example, as described herein, analytical information may be used to tailor future notifications. Thus, content used for a second notification and for generating a second notification payload may be determined based on information from the first notification response. In one example, the notification message words and/or response options may be modified based on information derived from the first notification response payload.

Figure 6:
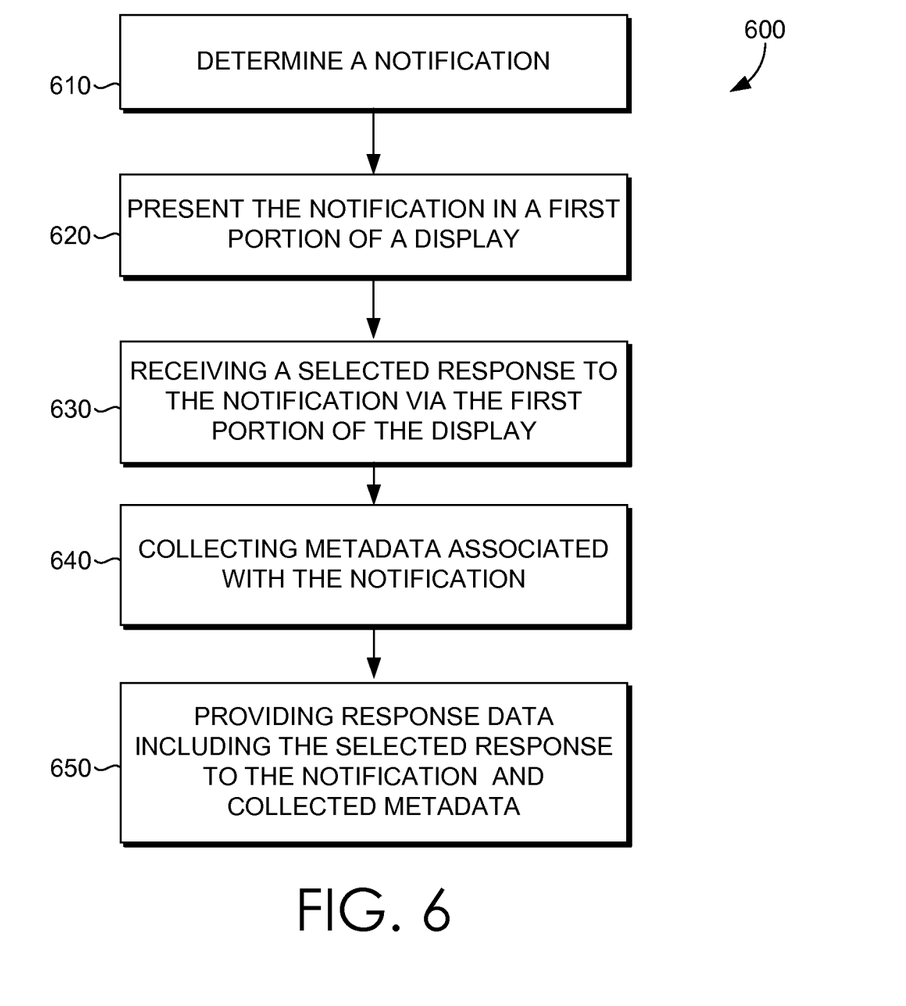

Turning now to FIG. 6, a flow diagram is provided illustrating a method 600 for facilitating user engagement and feedback by providing interactive communication. At step 610, a notification is determined. Some embodiments of step 610 are similar to step 420 of method 400 (FIG. 4). In some embodiments, a notification may be determined based on notification information, which may be received as notification content, such as described in step 410 of method 400, and which includes information for determining a notification message and multiple notification response options. As described previously, a notification may also be determined based on one or more notification parameters or a notifications policy, for example, notification formatting.

At step 620, the notification is presented in a first portion of a display. Some embodiments of step 620 present the notification in a manner such as described in step 430 of method 400. In particular, the notification may be presented based on one or more notification parameters or a notifications policy.

Embodiments of step 620 present the notification in a first portion of a display. In one embodiment, a notification is presented in a notifications window of a display on a client device, such as example notifications window 320 of display 365 on client device 360 of FIGS. 3A and 3B. In one embodiment, the first portion of a display comprises a pop-up window or a widget running on, by way of example and not limitation, the home screen(s), locked screen(s), recharging-mode screen(s), sleep-mode screen(s), or screen-saver screen(s) of a client device. In an embodiment, the notification is presented such that the user can see and respond to the notification without having to launch an app, navigate to a website or merchant shopping cart, open up a message, compose a reply, or complete another multi-step process.

At step 630, a user-selected response to the notification is received via the first portion of the display. Some embodiments of step 630 receive the selected response in a manner such as described in step 440 of method 400. Embodiments of step 630 receive the selected response from the same portion of the display that presents the notification. For example, as shown in the example notification of FIG. 3A (or FIG. 3B), the response is received from selecting a response option(s) provided in the notification. In this way, a user can respond to the notification immediately and without having to launch an app, access a website, open up a message, compose and send a reply, or complete another multi-step process.

At step 640, metadata associated with the notification is collected. Embodiments of step 640 collect metadata, such as the types of metadata collected by user response component 264 described in connection to FIG. 2. The metadata may be collected and associated with a user profile, user account, or user identification, in one embodiment, and may be used for tailoring future notifications to a user(s).

At step 650, response data, including the selected response option to the notification and collected metadata, is provided. In an embodiment, the response data also includes user profile information, user account information, and/or user identification information. In an embodiment of step 650, the response data is provided to a notifications service, an application associated with the notification, an online storage location, the notification solicitor, or a party associated with the notification solicitor, and may be transmitted over a communication network, such as network 275 of FIG. 2, or otherwise made available. In an embodiment, response data information may be incorporated into a user profile associated with the user.

Accordingly, we have described various aspects of technology directed to systems and methods for facilitating user engagement and receiving customer feedback by providing interactive notifications to users. It is understood that various features, sub-combinations, and modifications of the embodiments described herein are of utility and may be employed in other embodiments without reference to other features or sub-combinations. For example, although some embodiments of the invention are used for mobile devices, it is contemplated that other non-mobile computing devices, may also be used. Moreover, the order and sequences of steps shown in the example methods 400, 500, and 600 are not meant to limit the scope of the present invention in any way, and in fact, the steps may occur in a variety of different sequences within some embodiments hereof. Such variations and combinations thereof are also contemplated to be within the scope of embodiments of the invention.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A non-transitory computer storage medium storing computer-useable instructions that, when used by one or more computing devices, cause the one or more computing devices to perform operations comprising:
   receiving notification information including a notification message for a user and a plurality of notification response options associated with the notification message;
   presenting a notification on the client device including the notification message and the plurality of notification response options;
   receiving a response to the notification including one or more of the plurality of notification response options selected by a user from within the notification;
   determining metadata associated with the notification, wherein the metadata includes at least one of: information indicating the time and duration that the notification was presented on the client device, information indicating applications running on the client device when the notification is presented, or information about user activity on the client device before and after a response to the notification is received; and
   generating a response payload comprising information about the the metadata.

2. The non-transitory computer storage medium of claim 1 further comprising providing information from the response payload directly to a solicitor associated with the notification.

3. The non-transitory computer storage medium of claim 1, wherein the notification is presented on the client device according to a notifications policy.

4. The non-transitory computer storage medium of claim 1, wherein presenting the notification on the client device comprises presenting the plurality of notification response options as selectable options in proximity to the notification message.

5. The non-transitory computer storage medium of claim 1, wherein the notification is presented and at least one notification response option is selected by the user when the client device is in a locked mode of operation.

6. The non-transitory computer storage medium of claim 1, wherein the received notification information further includes notification parameters and wherein determining to present the notification includes determining to present the notification message and a plurality of notification response options based on the notification parameters.

7. The non-transitory computer storage medium of claim 6, wherein the notification parameters specify a priority level for presenting the notification.

8. The non-transitory computer storage medium of claim 6, wherein the notification parameters include a prerequisite condition of the client device for presenting the notification.

9. The non-transitory computer storage medium of claim 8, wherein the prerequisite conditions include at least one of a time of day, location of the client device, or user engagement level with the client device.

10. The non-transitory computer storage medium of claim 1, wherein determining a response to the notification further includes associating the determined response with a user profile for the user.

11. The non-transitory computer storage medium of claim 1, wherein the notification is provided on a first portion of a display while the client device is in a locked-screen mode.

12. A system comprising:
one or more processors; and
a non-transitory computer storage medium storing computer-useable instructions that, when used by the one or more processors, cause the one or more processors to:
receive content for a first notification;
generate a first notification payload using the received content for a first notification, the first notification payload including a notification message and a plurality of notification response options;
provide the first notification payload to a client device for display in a locked screen of the client device according to locked-screen notification parameters, the first notification payload including a notification message and a plurality of notification response options;
receive a first notification response payload from the client device including information indicating a user selection of one or more of the plurality of notification response options selected while the device is in a locked mode of operation, wherein the received first notification response payload further includes metadata associated with the notification presented on the client device;
receive content for a second notification that is determined based on the metadata included in the first notification response payload; and
generate a second notification payload using the received content for a second notification.

13. The system of claim 12, wherein the received first notification response payload further includes metadata associated with a notification presented on the client device based on the first notification payload.

14. The system of claim 12, wherein providing the first notification payload in a locked screen of a client device comprises pushing the first notification payload to the client device.

15. The system of claim 12, wherein the content for a first notification further includes the locked-screen notification parameters for presenting the notification, and wherein the locked-screen notification parameters are included in the first notification payload.

16. A computer-implemented method for providing an interactive communication comprising:
determining a notification to present on a client device, the notification including a notification message comprising an offer by a vendor to purchase a product, and a plurality of selectable notification response options associated with the notification message, the plurality of selectable notification response options including a buy response option;
presenting the notification on a first portion of a display on the client device;
collecting metadata associated with the notification, wherein the metadata includes at least one of: information indicating the time and duration that the notification was presented on the client device, information indicating applications running on the client device when the notification is presented, or information about user activity on the client device before and after a response to the notification is received;
receiving a selection of at least one notification response option, the selection received via the first portion of the display; and
in response to receiving a selection, based on the received selection of at least one notification response option:
if the received selection indicates that a user selected the buy response option, then in direct response to receiving the selection, completing a purchase transaction for the product, and providing to the vendor information indicating the purchase transaction and the collected metadata; and
if the received selection indicates that the user did not select the buy option, then providing to the vendor information indicating the received selection of at least one notification response option and collected metadata.

17. The computer-implemented method of claim 16, wherein the notification is presented on a first portion of a display while the client device is in a locked-screen mode.

18. The computer-implemented method of claim 17, wherein the selection of at least one notification response option is received while the client device is in a locked-screen mode.

19. The computer-implemented method of claim 16, wherein the notification further includes notification parameters and wherein determining to present the notification includes determining to present the notification message and a plurality of notification response options based on the notification parameters.

20. The computer-implemented method of claim 19, wherein the notification parameters specify a priority level for presenting the notification.

* * * * *

UNITED STATES PATENT AND TRADEMARK OFFICE
CERTIFICATE OF CORRECTION

PATENT NO.         : 9,922,357 B2
APPLICATION NO.    : 14/490401
DATED              : March 20, 2018
INVENTOR(S)        : Jay Proulx It is certified that error appears in the above-identified patent and that said Letters Patent is hereby corrected as shown below:

In the Claims

Column 21, Line 17:
Please delete "of the client device" after "condition"

Signed and Sealed this
Twenty-ninth Day of May, 2018

Andrei Iancu
*Director of the United States Patent and Trademark Office*